Feb. 24, 1953 P. C. VINCENT 2,629,473
FRICTION CLUTCH

Filed Aug. 6, 1947 3 Sheets-Sheet 2

INVENTOR
PHILIP C. VINCENT
BY Young, Emery & Thompson
ATTYS.

Patented Feb. 24, 1953

2,629,473

UNITED STATES PATENT OFFICE 2,629,473

FRICTION CLUTCH

Philip Conrad Vincent, Stevenage, England, assignor to Vincent "H. R. D." Company Limited, Stevenage, England, a British company Application August 6, 1947, Serial No. 766,524
In Great Britain January 30, 1946

Section 1, Public Law 690, August 8, 1946
Patent expires January 30, 1966

1 Claim. (Cl. 192—74)

This invention relates to clutch mechanisms, such as clutches, brakes and like friction couplings, and has for an object to provide a construction capable of transmitting considerable torque and needing only slight effort to disengage the clutch mechanisms.

According to this invention, a clutch mechanism comprises two friction transmissions, the torque reaction of one being arranged to apply frictional engaging pressure to the other.

One of the aforesaid friction transmissions may comprise friction faces axially engageable, while the other comprises friction faces radially engageable.

Yielding means may be provided tending to maintain one transmission in a disengaged position, while manipulating means are provided for engaging and disengaging the other transmission. For example, the manipulating means may be arranged to control the aforesaid axially engageable friction faces.

In a clutch having driving and driven members one of them has fixed thereon to rotate therewith a part of each frictional transmission while the other of them has fixed thereon to rotate therewith a mating part of only one of said transmissions which part is relatively rotatable to a mating part of the other transmission and the engagement of the latter mating part with one of the first said parts is arranged to effect said relative movement and means responsive to said relative rotation is arranged automatically to effect engagement of the other mating part with the other of the first said parts.

In one form of construction said relative rotation in either direction is arranged to establish a drive.

In an alternative arrangement said relative rotation in one direction is arranged to establish a drive and relative rotation in the opposite direction interrupts the drive whereby a free-wheel clutch is provided.

In one specific form of construction, one of the driving or driven members has fixed thereto a drum having an internal friction surface and a plate having a friction surface transverse to the drum axis and the other member has fixed thereto a carrier having pivotally mounted thereon one or more shoes for engagement with the friction face of the drum and a second friction plate is mounted for axial engagement with the first said plate and is rotatable relatively to said carrier and is so interconnected therewith that relative rotation causes pivotal movement of each said shoe while the aforesaid manipulating means are arranged to effect axial movement of said second friction plate. The engaging faces of said friction plates may be flat, conical or any other convenient shape.

In such an arrangement each said shoe may be pivoted intermediate of its ends on the carrier and is so interconnected with the second friction plate that rotation thereof relatively to the carrier in one direction tilts each shoe and brings one end thereof into engagement with the drum and rotation of the second friction plate in the other direction brings the other end of each shoe into engagement with the drum whereby a two-way drive is provided.

Alternatively each said shoe may be pivoted at or near one end to said carrier and is so interconnected with the second friction plate that rotation thereof relatively to the carrier in one direction tilts each shoe into engagement with the drum and rotation of the friction plate in the other direction brings each shoe out of engagement with the drum whereby a free-wheel clutch is provided.

In yet a further alternative arrangement in which a number of shoes are mounted on said carrier they are so interconnected with the second friction plate that rotation thereof relatively to the carrier in one direction moves certain of them into engagement with the drum and others out of engagement while rotation of the second friction plate in the opposite direction brings the first-said shoes out of engagement and the others into engagement.

In any of the arrangements referred to above the interconnection between the second friction plate and each of said shoes may comprise a toggle-link or other mechanism whereby comparatively small torque transmitted by the friction plate exerts a large radial force on the shoes.

In the case where the shoes are pivoted intermediate of their ends through the carrier, the aforesaid toggle link may be connected either to the trailing or to the leading end of each shoe.

Preferably means are provided which tend to move said shoes into a disengaged position.

Preferably the shoes are so pivoted on the carrier that frictional engagement thereof with the drum tends further to increase the engaging pressure.

The following is a description of a clutch according to this invention suitable for use with a motor cycle as shown in the accompanying drawings in which.

Figure 1:
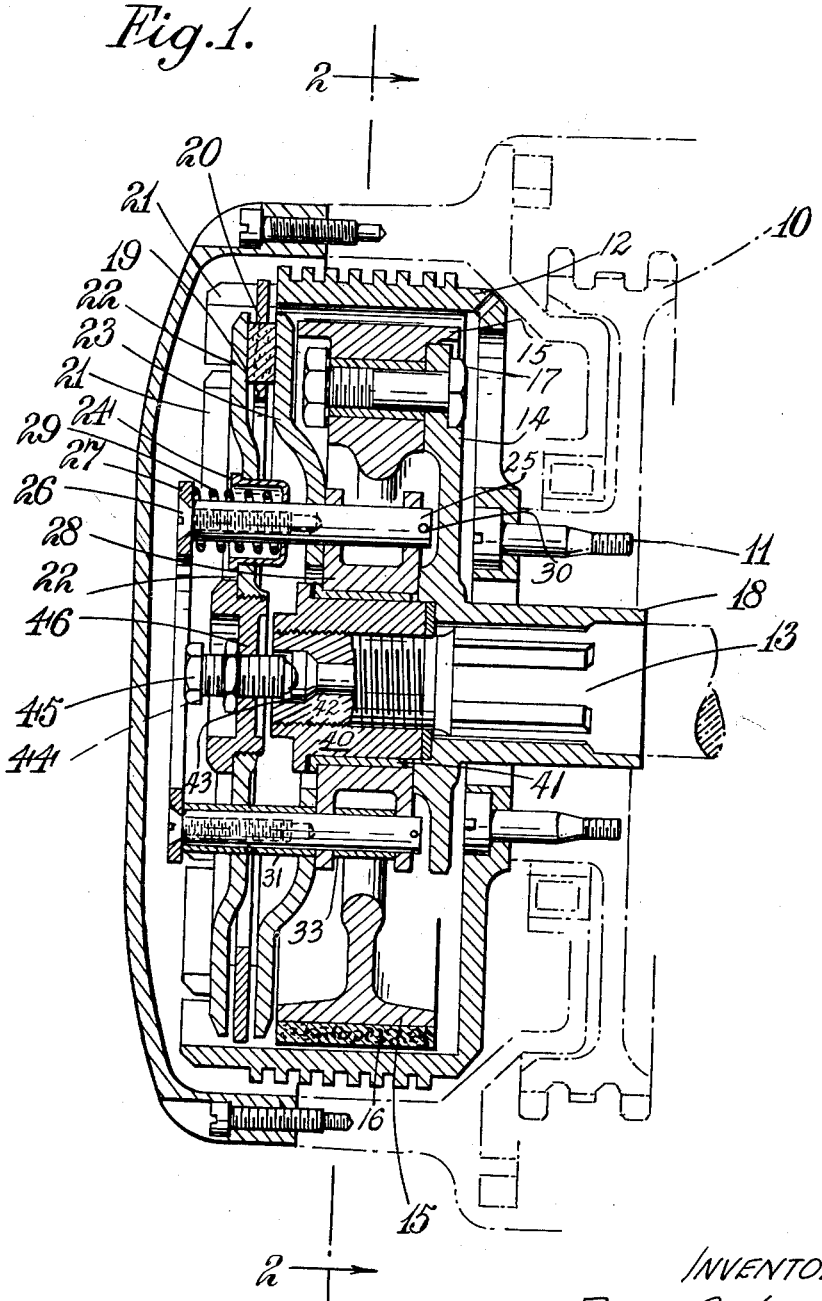
Figure 1 is a section along the axis of the clutch.

A driving sprocket wheel 10 has secured to it by screws 11 a drum 12. A driven shaft 13 has keyed to it within the drum a carrier-plate 14 on which are pivotally mounted two arcuate shoes 15, each having a friction lining pad 16 secured at each end thereof. The pivotal mounting 17 for each shoe is arranged intermediate of the ends of the shoe so that either end may be brought into engagement with the drum according to the direction of drive. The carrier plate 14 is provided with a hub portion 18 on which the sprocket wheel 10 is rotatably mounted. An annular friction plate 19 is provided with teeth 20 on its periphery, which teeth slide axially in slots 21 formed in the rim of the drum 12. The friction plate 19 is sandwiched between two other plates 22, 23 which are resiliently pressed against it by spring means. For this purpose, the outermost plate 22 is provided with a number of cup-shaped sockets 24 through openings, in the bottoms of which extend pins 25, which pins are secured by screws 26 to a ring 27. The pins pass through holes in the innermost plate 23 and through a channelled spacing member 28 arranged between that plate and the carrier plate 14. Each of the pins 25 is encircled by a compression spring 29 which at one end abuts against the bottom of the cup and at the other end against the aforesaid ring 27. The pins 25 are held against withdrawal from the member 28 by a securing wire 30, which is threaded through holes at the end of the pins. Additional pins 31 (see Figure 2) are likewise held in the member 28 and are attached to the ring 27, each of these additional pins is provided with spacing sleeves 33. A link 34 pivoted at 35 at one end of each shoe connects the shoe to one of the pins 25. Each of the shoes is provided with a socket 36 in which is mounted a plunger 37 having a shoulder 32 which may abut a shoulder 48 in the socket, thereby limiting the movement of the plunger in a direction out of the socket. The plunger projects from the socket and is arranged to abut against one of the pins 25. The inner end of each plunger is engaged by one end of a nested spring combination 38, the other end of which abuts against a screw plug 39 which closes the inner end of the socket.

Figure 2:
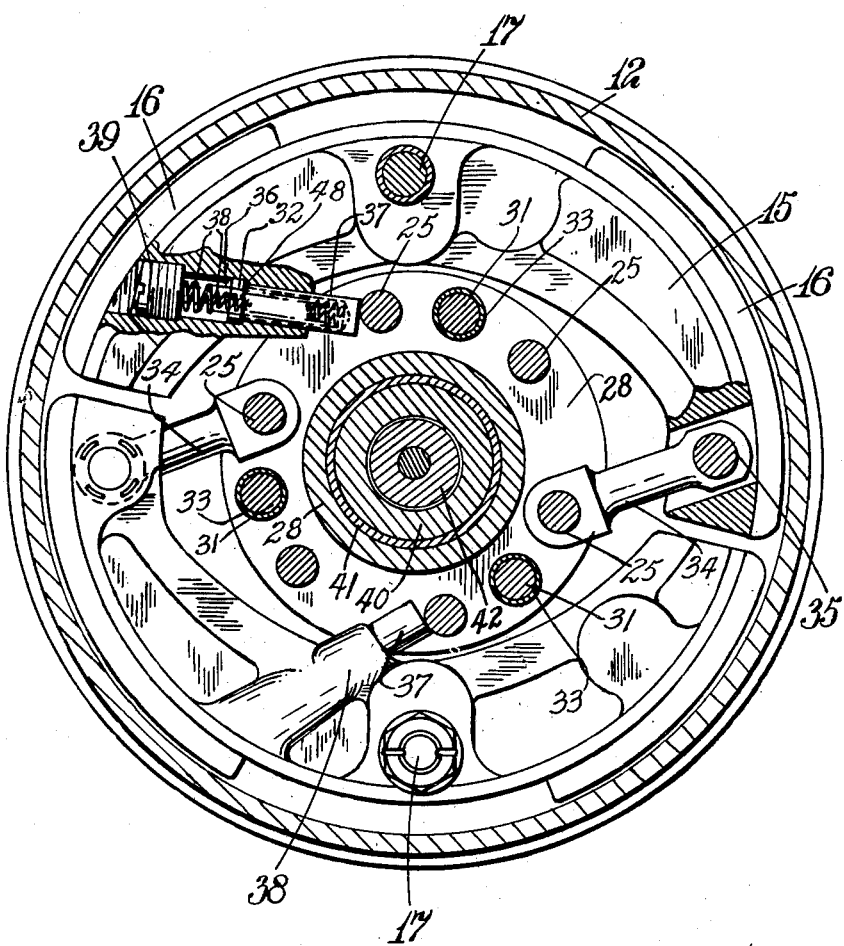
Figure 2 is a section on the line 2—2 of Figure 1.

The hub-portion 18 of the carrier-plate 14 is retained on the keyed portion of the shaft 13 by a lock nut 40. The lock nut is cylindrical and is encircled by a bushing 41 on which the member 28 is rotatable. The driven shaft 13 is hollow and extending through it is a push rod 42, the end of which is cupped at 43 to hold a ball 44, the ball is arranged to engage the recessed end of an adjustable set screw 45 carried by a threaded member 46 fixed to the outer plate 22, thus, when the push rod 42 is moved to the left, the frictional engagement between the plate 19 and the two plates 22 and 23 is relieved. The provision of the set-screw 45 ensures that when the push rod and its operating mechanism are at one limit of their movement, the full force of the springs 29 are exerted on the clutch plate 22. The operation of the clutch is as follows:

Assuming that the driving sprocket 10 and drum 12 are rotating in the direction of the arrow in Figure 2 and that there is no resistance to motion of the shaft 13, the effect of the two spring plungers will be to maintain the member 28 and the arcuate shoes in a definite centralized position, such that friction pads 16 at both ends of each shoe are clear of the drum and no drive can be transmitted. Due to the shoulders 32 on the plungers 37 and the cooperating shoulders 48 of the sockets, this position is mechanically controlled and does not depend upon equality of compression of the springs 38 in the two sockets. This condition will exist if the shaft 13 is rotating freely with the plates 19, 22, 23 engaged, which may take place when the shaft 13 has no load, and also when the plates 19, 22, 23 are disengaged.

Assuming that the plates 19, 22 and 23 are caused to engage by allowing the push rod 42 to move to the right, while some resistance to movement of the shaft 13 is present, as when starting the vehicle from rest, the plate 23 will cause the member 28 to rotate in the direction of the arrow, which will cause the inner ends of the links 34 also to move in that direction, thereby exerting a toggle action on the pins 35 and moving the ends of the shoes outwards until the friction pads come into contact with the drum. The drive is then transmitted through the shoes to the carrier plate 14 and thence to the shaft 13. With this arrangement, the frictional force developed is dependent upon the degree of toggle action provided by the linkage, which can be varied between wide limits and also upon the torque which can be derived from the friction plates 19, 22 and 23. Thus, the drive is not positive in the sense that slip can occur if the driven shaft 13 becomes locked, yet it is possible to utilize very light spring pressures on the plates 19, 22 and 23 and thus provide very light control, while still obtaining adequate driving power by reason of the toggle linkage.

When the motion described above takes place, the plunger 37 in the upper shoe shown in Figure 2 will be forced upwards by its abutting pin in the member 28, and the movement of the shoe itself will still further compress the spring. The plunger on the lower shoe will simply move away from its abutting pin, due to the provision of a shoulder. When the plates 19, 22 and 23 are disengaged, the spring 38 forces the upper plunger outwards again, and simultaneously returns the shoes and the member 28 into the centralized position.

If on the other hand, the drive is reversed, i. e. power is applied to shaft 13 while resistance is applied to the drum 12 as when starting the engine, the whole action is reversed, and the links 34 now pull the ends of the shoes inwards, causing their other ends to contact the drum and so to take up the drive. It will be seen that the shoes are approximately equally disposed about their pivots 17, and thus there is little centrifugal action tending to pull the shoes into the engaged position at high speed.

As described and depicted, the friction pads 16 are so arranged in relation to the pivot axes 17 that there is a tendency for the circumferential frictional force to pull the shoes into harder engagement whether the drum is either the driving or the driven member. If desired, the linkage can be arranged so that the links 34 are attached to the trailing instead of the leading ends of the shoes, for the normal direction of drive, the construction being similar to that shown in Figure 2 assuming the direction of the arrow is reversed.

For certain applications where much greater torque capacity is required in one direction than the other, two shoes 50, 51 (Figure 3) only could be provided extending on one side only of their pivot axes 52, 53 and the two links 54, 55 being arranged, when the direction of drive corresponds to the arrow, to move the shoes outwardly.

Figure 3:
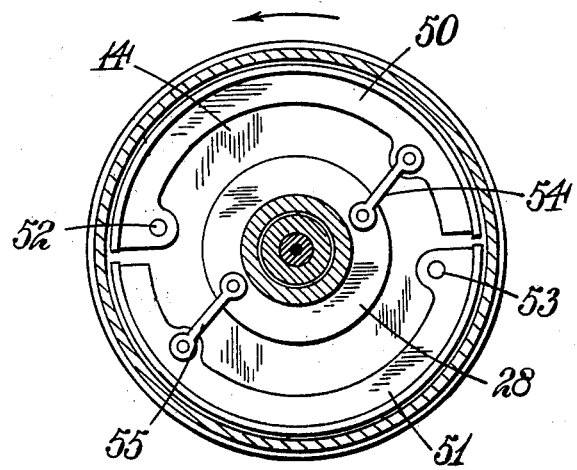
Figure 3 is a similar view to Figure 2 showing an alternative arrangement of shoes and toggle links.

In order that the arrangement of shoes shown in Figure 3 may transmit a drive in either direction, it would be necessary for one of the toggle links 55 to have the opposite slope to a radius. Thus, in one direction of drive, one shoe would be operated while the other was in operative, while in the opposite direction of drive, the operation of the two shoes would be reversed.

Figure 4:
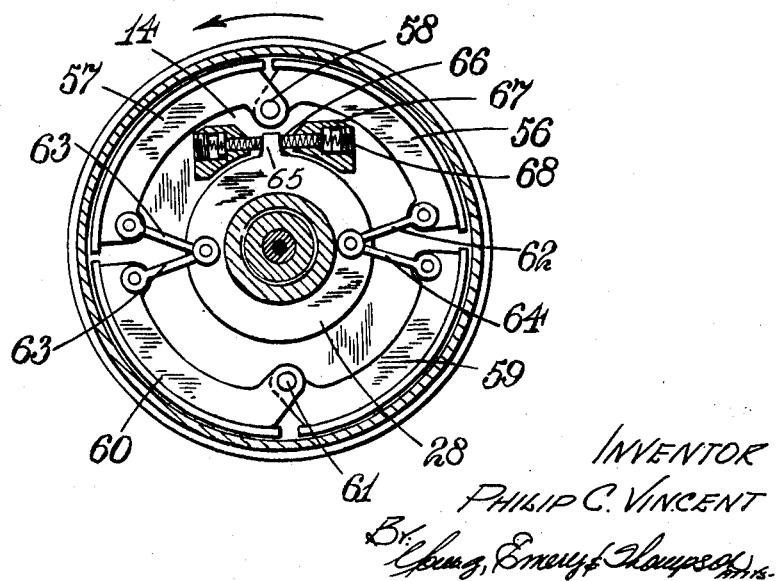
Figure 4 is yet a further alternative arrangement of shoes and toggle links.

In the arrangement shown in Figure 4, the shoes are arranged so that a drive may be transmitted in both directions. In this instance two shoes are independently pivoted to each of two pivot pins so as to extend on opposite sides thereof. Thus, the shoes 56, 57 are pivoted on opposite sides of the pin 58 and the shoes 59, 60 are pivoted on opposite sides of the pivot pin 61.

The toggle links 62, 63 associated with the shoes 56 and 60 are arranged to move those shoes either both inwardly or outwardly according to the direction of drive, while the toggle links 63, 64 are arranged to move the shoes 57 and 59 either both inwardly or outwardly but in an opposite direction to the first said shoes.

In any of these arrangements, shoes as described with reference to Figures 2, 3 and 4 may be duplicated by providing two sets of shoes side by side along the axis of rotation and so coupling them to the member 28 by toggle links that corresponding toggle links of the two sets are oppositely inclined with respect to radii, so that when one shoe is engaged the other one by its side is disengaged.

Centralizing means may be provided for the shoes in any of these arrangements, similar to that described with reference to Figures 1 and 2. For example, in the arrangement shown in Figure 4 a lug or lugs 65 may be provided on the member 28, against which abut shouldered plungers 66 housed in sockets in bosses 67 formed on the shoe carrier. In the centralized position the plungers are held against their shoulders by the springs which engage them. These plungers only return the member 28 to the central position, the shoes being returned by the action of the links 62.

As indicated earlier in the specification, the invention is applicable to brakes as well as clutches, in which case the drum 12 may be attached to the vehicle wheel while the carrier plate 14 is fixed against rotation to a part of the vehicle.

If desired, suitable means may be provided to keep the plates 22, 23 apart and other means to force them together, to apply the brakes.

I claim:

A clutch mechanism comprising co-axial driving and driven members, a drum secured to one of said members, a friction clutch having one half secured to said one of the members, two pairs of clutch shoes mounted on the other of said members, the shoes of each pair being pivoted about axes at opposite ends of a diameter and engageable with the drum, a rotatable element mounted on one of said members within the clutch shoes and connected to the other half of the friction clutch, a toggle link pivotally connecting each clutch shoe with said rotatable element, and spring means between the rotatable element and the clutch shoe, the toggle links of one pair of clutch shoes being oppositely inclined to the toggle links of the other pair of clutch shoes whereby rotation between the rotatable element and clutch shoes in one direction disengages one pair of clutch shoes and engages the others, while rotation in the opposite direction engages said one pair and withdraws the others.

PHILIP CONRAD VINCENT.

REFERENCES CITED

The following references are of record in the file of this patent:

UNITED STATES PATENTS

| Number | Name | Date |
|---|---|---|
| 985,286 | Sailer | Feb. 28, 1911 |
| 1,783,741 | Mears | Dec. 2, 1930 |
| 1,922,054 | Magee | Aug. 15, 1933 |
| 1,925,897 | Fawick | Sept. 5, 1933 |
| 2,065,382 | Levy | Dec. 22, 1936 |

FOREIGN PATENTS

| Number | Country | Date |
|---|---|---|
| 282,029 | Great Britain | Nov. 14, 1927 |
| 439,894 | Great Britain | 1935 |
| 619,046 | Great Britain | Mar. 3, 1949 |
| 38,006 | France | Dec. 17, 1930 |